United States Patent

Sironi et al.

(10) Patent No.: US 12,062,217 B2
(45) Date of Patent: Aug. 13, 2024

(54) METHOD OF TRACKING OBJECTS IN A SCENE

(71) Applicant: PROPHESEE, Paris (FR)

(72) Inventors: Amos Sironi, Questembert (FR); Pierre De Tournemire, Paris (FR); Daniele Perrone, Noisy le Grand (FR)

(73) Assignee: PROPHESEE, Paris (FR)

( * ) Notice: Subject to any disclaimer, the term of this patent is extended or adjusted under 35 U.S.C. 154(b) by 545 days.

(21) Appl. No.: 17/413,347

(22) PCT Filed: Dec. 13, 2019

(86) PCT No.: PCT/EP2019/085199
§ 371 (c)(1),
(2) Date: Jun. 11, 2021

(87) PCT Pub. No.: WO2020/120782
PCT Pub. Date: Jun. 18, 2020

(65) Prior Publication Data
US 2022/0036110 A1 Feb. 3, 2022

(30) Foreign Application Priority Data
Dec. 13, 2018 (EP) .................................. 18212488

(51) Int. Cl.
*G06V 10/20* (2022.01)
*G06V 20/56* (2022.01)

(52) U.S. Cl.
CPC ............ *G06V 10/255* (2022.01); *G06V 20/56* (2022.01)

(58) Field of Classification Search
CPC ........... G06T 7/248; G06T 7/292; H04N 9/68; G06V 10/22; G06V 10/255
See application file for complete search history.

(56) References Cited

U.S. PATENT DOCUMENTS

| | | | | |
|---|---|---|---|---|
| 6,545,705 B1 * | 4/2003 | Sigel | ...................... | H04N 7/188 348/222.1 |
| 6,567,116 B1 * | 5/2003 | Aman | ...................... | G01S 17/66 348/169 |

(Continued)

FOREIGN PATENT DOCUMENTS

WO   2018/152214 A1   8/2018

OTHER PUBLICATIONS

Delbrück et al., "Activity-Driven, Event-Based Vision Sensors," Proceedings of 2010 IEEE International Symposium on Circuits and Systems (ISCAS), pp. 2426-2429.

(Continued)

*Primary Examiner* — Yosef Kassa

(57) ABSTRACT

The present invention relates to a method of tracking objects in a scene observed by an event-based sensor that produces events asynchronously from a matrix of sensing elements, wherein, from each sensing element of the matrix, respective events are produced as a function of variations of light incident on the sensing element, the method comprising: detecting, by a first process, an object in the scene from asynchronous events produced by the event-based sensor; and determining, by a second process, a track associated to the detected object from asynchronous events produced by the event-based sensor; wherein the first process has a time resolution lower than the second process.

15 Claims, 6 Drawing Sheets

(56) References Cited

U.S. PATENT DOCUMENTS

| | | | | |
|---|---|---|---|---|
| 7,023,469 | B1* | 4/2006 | Olson | H04N 7/188 |
| | | | | 348/154 |
| 8,989,448 | B2* | 3/2015 | Sawai | G06T 7/215 |
| | | | | 382/162 |
| 9,031,279 | B2* | 5/2015 | Gefen | G06T 7/248 |
| | | | | 382/173 |
| 9,094,615 | B2* | 7/2015 | Aman | G06T 19/006 |
| 2018/0174323 | A1 | 6/2018 | Ji et al. | |

OTHER PUBLICATIONS

Gehrig et al., "Asynchronous, Photometric Feature Tracking using Events and Frames," Retrieved from the Internet: URL:http://openaccess.thecvf.com/content_ECCV_2018/papers/Daniel_Gehrig_Asynchronous_Photometric_Feature_ECCV_2018_paper.pdf, Sep. 2018, 16 pages.

Kueng et al., "Low-Latency Visual Odometry using Event-based Feature Tracks," 2016 IEEE/RSJ International Conference on Intelligent Robots and Systems (IROS), Daejeon Convention Center, Oct. 9-14, 2016, Daejeon, Korea, pp. 16-23.

Lichtsteiner et al., "A 128 x 128 120dB 15 μs Latency Asynchronous Temporal Contrast Vision Sensor," *IEEE Journal of Solid-State Circuits 43*(2):566-576, Feb. 2008.

Litzenberger et al., "Embedded Vision System for Real-Time Object Tracking Using an Asynchronous Transient Vision Sensor," 2006 IEEE 12th Digital Signal Processing Workshop & 4th IEEE Signal Processing Education Workshop, Sep. 27, 2006, pp. 173-178.

Ni et al., "Visual Tracking Using Neuromorphic Asynchronous Event-Based Cameras," *Neural Computation* 27:925-953, 2015.

Posch et al., "A QVGA 143 dB Dynamic Range Frame-Free PWM Image Sensor With Lossless Pixel-Level Video Compression and Time-Domain CDS," *IEEE Journal of Solid-State Circuits 46*(1):259-275, Jan. 2011.

Reinbacher et al., "Real-Time Panoramic Tracking for Event Cameras," arCiv: 1703.05161v2, Mar. 2017, 9 pages.

Sironi et al., "HATS: Histograms of Averaged Time Surfaces for Robust Event-based Object Classification," IEEE/CVF Conference on Computer Vision and Pattern Recognition, 2018, pp. 1731-1740.

Tedaldi et al., "Feature Detection and Tracking with the Dynamic and Active-pixel Vision Sensor (DAVIS)," 2016 Second International Conference on Event-based Control, Communication, and Signal Processing (EBCCSP), 7 pages.

Valeiras et al., "An Asynchronous Neuromorphic Event-Driven Visual Part-Based Shape Tracking," *IEEE Transactions on Neural Networks and Learning Systems* 26(12):3045-3059, Dec. 2015.

* cited by examiner

METHOD OF TRACKING OBJECTS IN A SCENE

BACKGROUND OF THE INVENTION

The present invention relates to the field of object tracking, wherein an object is localized and its trajectory is determined over time. In particular, the invention relates to methods for tracking objects using an event-based sensor.

Tracking an object in a scene, in the sense of estimating the trajectory of the object as it moves into the scene, is an important topic in computer vision. Object tracking plays a fundamental role in a wide range of applications, such as visual surveillance, video compression, driving assistance, odometry, simultaneous localization and mapping (SLAM), traffic monitoring, automated valet parking systems, etc.

For these applications, it is essential to be able to handle sudden changes, such as a change of direction of an object, a new object appearing in the scene, occlusions and disocclusions. For instance, in driving assistance, the system must react very quickly to a sudden change of direction of a car, or a pedestrian entering the field of view.

In these applications, the objects to be tracked may suddenly change direction, new objects may appear, occlusions/disocclusions may occur, and the tracking system should respond very quickly to these situations.

In conventional algorithms, tracking is performed based on a sequence of images acquired at a fixed frame frequency. In case of sudden changes, the tracking accuracy is therefore limited by the inter-frame period, which may be much greater than the dynamics of the changes. Furthermore, running such detecting/tracking systems at a high frame rate would be very computationally expensive, and sometimes not even possible because of the latency of the system. For instance, if the detector needs 100 milliseconds to detect cars in a picture, it cannot run at more than 10 frames per second, while a much faster reaction time is needed for the overall system. Moreover, running a detector on an embedded platform can lower the detection rate to about 1.5 frames per second, which may be too slow for the above-mentioned applications.

Alternatively, it is possible to use event-based light sensors generating asynchronous signals rather than conventional frame-based sensors. Event-based light sensors deliver compressed digital data in the form of events. A presentation of such sensors can be found in "Activity-Driven, Event-Based Vision Sensors", T. DelbrUck, et al., Proceedings of 2010 IEEE International Symposium on Circuits and Systems (ISCAS), pp. 2426-2429. Event-based vision sensors have the advantage of removing redundancy, reducing latency and increasing the dynamic range with respect to conventional cameras.

The output of such an event-based light sensor can consist, for each pixel address, in a sequence of asynchronous events that represent changes in a light parameter (e.g. luminance, light intensity, reflectance) of the scene at the time they occur. Each pixel of the sensor is independent and detects changes in intensity greater than a threshold since the emission of the last event (for example a contrast of 15% on the logarithm for the intensity). When the change in intensity exceeds the threshold set, an ON or OFF event may be generated by the pixel according to whether the intensity increases or decreases. Such events may be referred to as "Change Detection events", or CD events, hereinafter.

Typically, the asynchronous sensor is placed in the image plane of the optics for acquisition. It comprises an array of sensing elements, such as photosensitive elements, organized into a matrix of pixels. Each sensing element corresponding to a pixel p produces successive events e(p,t) depending on variations of light in the scene at times t.

For each sensing element, the asynchronous sensor generates an event-based signal sequence depending on the variations of light received by the sensing element from the scene that appears in the field of vision of the sensor.

The asynchronous sensor carries out an acquisition to output a signal which, for each pixel, may be in the form of a succession of instants $t_k$ (k=0, 1, 2, . . . ) at which an activation threshold Q is reached. Each time this luminance increases by a quantity equal to the activation threshold Q starting from what it was in time $t_k$, a new instant $t_{k+1}$ is identified and a spike is emitted at this instant $t_{k+1}$. Symmetrically, each time that the luminance observed by the sensing element decreases by the quantity Q starting from what it was in time $t_k$, a new instant $t_{k+1}$ is identified and a spike is emitted at this instant $t_{k+1}$. The signal sequence for the sensing element includes a succession of spikes positioned over time at instants $t_k$ depending on the light profile for the sensing element. The output of the sensor 10 is then in the form of an address-event representation (AER). In addition, the signal sequence may include a luminance attribute corresponding to a variation of incident light.

The activation threshold Q can be fixed, or can be adapted as a function of the luminance. For example, the threshold can be compared to the variations in the logarithm of the luminance for generating events when exceeded.

By way of example, the sensor can be a dynamic vision sensor (DVS) of the type described in "A 128×128 120 dB 15 μs Latency Asynchronous Temporal Contrast Vision Sensor", P. Lichtsteiner, et al., IEEE Journal of Solid-State Circuits, Vol. 43, No. 2, February 2008, pp. 566-576, or in patent application US 2008/0135731 A1. The dynamics of a retina (minimum duration between the action potentials) can be approached with a DVS of this type. The dynamic behavior surpasses that of a conventional video camera that has a realistic sampling frequency. When a DVS is used as the event-based sensor 10, data pertaining to an event originating from a sensing element include the address of the sensing element, a time of occurrence of the event and a luminance attribute corresponding to a polarity of the event, e.g. +1 if the luminance increases and −1 if the luminance decreases.

An example of a light profile received by such an asynchronous sensor and of a signal generated by this sensor in response to the light profile is represented, with arbitrary scales, in FIG. 1.

The light profile P seen by the sensing element includes an intensity pattern which, in the simplified example shown for the explanation, has alternating rising and falling edges. At t0, when the luminance increases by a quantity equal to the activation threshold Q, an event is generated by the sensing element. The event has a time of occurrence t0 and a luminance attribute, i.e. polarity in the case of a DVS (level+1 at t0 in FIG. 1). With the increase of the luminance in the rising edge, subsequent events with the same positive polarity are generated each time the luminance further increases by the activation threshold. These events form a pulse train denoted as B0 in FIG. 1. When the falling edge starts, the luminance decreases and gives rise to another pulse train B1 of events of opposite polarity, i.e. negative polarity (level−1), from time t1.

Some event-based light sensors may associate the detected events with measurements of light intensity (e.g. grayscales), such as the Asynchronous Time-based Image Sensor (ATIS) described in the article "A QVGA 143 dB Dynamic Range Frame-Free PWM Image Sensor With Lossless Pixel-Level Video Compression and Time-Domain CDS", C. Posch, et al., IEEE Journal of Solid-State Circuits, Vol. 46, No. 1, January 2011, pp. 259-275. Such events may be referred to as "Exposure Measurement events", or EM events, hereinafter.

Since asynchronous sensors are not sampled on a clock like a conventional camera, they can take the sequencing of events into account with very great time precision (for example of about 1 µs). If such sensors are used to reconstruct a sequence of images, an image frame rate of several kilohertz can be achieved, compared to a few tens of hertz for conventional cameras.

Some event-based algorithms have been developed for tracking objects in a scene. However, the robustness and the stability of these algorithms are much weaker than those of frame-based algorithms. In particular, they are very sensitive to outliers and suffer from drifts. Furthermore, most of these algorithms (for instance, the algorithm described in "Feature detection and tracking with the dynamic and active-pixel vision sensor (DAVIS)", D. Tedaldi et al., 2016 Second International Conference on Event-based Control, Communication, and Signal Processing (EBCCSP)) rely on assumptions about object shapes, which can greatly reduce the accuracy of object detection and tracking. In addition, these algorithms show poor results in case of occlusions.

There is thus a need for methods of object tracking which can be performed with high temporal resolution, without suffering the robustness and stability problems mentioned above.

SUMMARY OF THE INVENTION

The invention relates to a method of tracking objects in a scene observed by an event-based sensor that produces events asynchronously. The event-based sensor has a matrix of sensing elements. From each sensing element of the matrix, respective events are produced as a function of variations of light incident on the sensing element. The method comprises:
  detecting, by a first process, an object in the scene from asynchronous events produced by the event-based sensor; and
  determining, by a second process, a track associated to the detected object from asynchronous events produced by the event-based sensor;
  wherein the first process has a time resolution lower than the second process.

By "track" it is meant a time sequence relative to the position of the object in the scene over time, i.e. a time sequence corresponding to the trajectory of the object over time. For instance, a track may comprise a temporal series of dated coordinates $(x_i, y_i, t_i):\{(x_1, y_1, t_1), \ldots, (x_k, y_k, t_k)\}$, wherein each $(x_i, y_i)$ correspond to the position of a point representing the object at time $t_i$. This point may be the center of gravity when the object is represented by its shape (e.g. in the case where a segmentation mask is used, as detailed below), a center of gravity of a figure comprising the object, a corner of this figure, etc. In the following, "tracking an object" corresponds to the determination of the trajectory of the object in the scene.

"Object" is not limited to feature points or simple local patterns like corners or lines. It may be a more complex pattern or a material thing that is recognized partially or as a whole such as for example car, human body or body part, animal, road sign, bike, red fire, ball and the like. "Time resolution" refers to a time elapsed between two iterations of the process, which can be fixed or variable.

For instance, the event-based sensor may produce EM events, CD events, or both EM events and CD events. In other words, the detection and/or the tracking may be performed based on EM events and/or CD events.

The first process allows determining accurately the objects present in the scene, for instance via a detection algorithm applied on a frame determined based on the events received by the event-based sensor. However such algorithm is computationally expensive and may not be applied at a very high temporal resolution. The second process compensates for this weakness by tracking, at a higher temporal resolution the objects detected during the first process, and updating the position of the objects when a new event is received from the sensor.

This two-process method may take advantages of the high temporal resolution and sparse sampling of the event-based camera on the one hand, and of global information accumulated over a larger period of time and large field of view on the other hand. Compared to the event based algorithms (e.g. algorithms provided in "An asynchronous neuromorphic event-driven visual part-based shape tracking", D. R. Valeiras et al., IEEE transactions on neural networks and learning systems, vol. 26, issue 12 December 2015, pp. 3045-3059), this solution provides robustness to drifting and occlusions/disocclusions, in particular because the first process may be used to correct small errors accumulated by the second process. Furthermore, no assumptions on the shape of the object to be track needs to be done.

Compared to the frame based algorithms, this solution enables high time resolution, therefore providing smooth and accurate trajectory estimation, while keeping low overall computational complexity.

It has to be noted that the two processes have complementary characteristics, and that there is no strict hierarchy between them.

In an embodiment, the first process may comprise determining a category of the detected object. For instance, the category may be determined among a set of categories, said set being defined depending on the application. For instance, in the context of driving assistance, the set of categories may be {car, pedestrian, road sign, bike, red fire}. The determination of the category may be performed by machine learning (e.g. a supervised learning algorithm).

In an embodiment, a new iteration of the first process is run according to a predefined time sequence.

This makes it possible to regularly adjust the results obtained by the second process, which may suffer from drifting. The interval between two instants of predefined time sequence may be fixed or variable. The order of magnitude of the time interval may depend on the application. For instance, for surveillance/monitoring system mounted on a non-moving support, the first process may be run at very low temporal resolution. The time between two iterations may be about 1 s or 2 s. For driving assistance system mounted on the cockpit of a vehicle, the time between two iterations of the first process may be shorter, e.g. between 0.1 s and 0.5 s.

It has to be noted that a new iteration of the first process may be run under certain conditions (e.g. a number of events received in a region of the scene under a threshold, as detailed below), in addition to the iterations run according to the predefined time sequence.

In an embodiment, the first process may comprise determining a region of interest in the matrix of sensing elements, the region of interest including the detected object; and the second process may comprise determining the track based on asynchronous events produced by sensing elements in a region including the region of interest.

The region of interest may be a region whose shape corresponds to the shape of the object (e.g. a segmentation mask as detailed below), or a region larger than the object and comprising the object (e.g. a bounding box, which may be a rectangle or another predefined figure). The bounding box allows easier and computationally cheaper data processing, but does not provide very precise information about the exact location and shape of the object. When precise information is needed, a segmentation mask may be used.

When an object is moving, events are produced inside the object, at its edges and around its edges. Using events produced inside and around the region of interest allows better tracking of moving objects. For instance, this region may correspond to a predefined neighborhood of the region of interest (i.e. a region including all neighbor pixels of all the pixels of the region of interest). The neighborhood may be, for instance, determined based on a given pixel connectivity (e.g. 8-pixel connectivity).

In such embodiments, the second process may further comprise updating the region of interest based on asynchronous events produced in a region including the region of interest.

In addition, the second process further may comprise running a new iteration of the first process based on a parameter of the region of interest, wherein the parameter is one of a size of the region of interest and a shape of the region of interest.

Some parameter may indeed indicate potentially strong changes in the scene, for which the second process may accumulate errors. Running a new iteration of the first process allows correcting these errors and accurately determining the changes in the scene.

Alternatively or in addition, the second process may further comprise running a new iteration of the first process if a number of events produced in the region of interest during a time interval exceeds a threshold.

Similarly, a large number of events may indicate strong changes in the scene.

Furthermore, the method of the present invention may comprise:
- determining associations between detected objects and determined tracks; and
- updating a set of detected objects and/or a set of determined tracks based on the associations.

Therefore, the results of the first process and the results of the second process may be correlated, and the object location may be more accurately determined. Indeed, the trajectory of the object may be validated or corrected based on the determined associations. This improves the robustness and the stability of the tracking and prevents from drifting.

The method may further comprise:
- if a given object among detected objects is associated with a given track among determined tracks, updating the given track based on a position of the given object.

In addition or alternatively, the method may further comprise:
- if a given object among detected objects is not associated with any track among determined tracks, initializing a new track corresponding to the given object;
- if a given track among determined tracks is not associated with any object among detected objects, deleting the given track; and
- if a first objet and a second object among detected objects are both associated with a first track among determined tracks, initializing a second track from the first track, each of the first and second tracks corresponding to a respective object among the first and second objects;
- if a given object among detected objects is associated to a first track and a second track among determined tracks, merging the first track and the second track.

In an embodiment, the second process may further comprise:
- determining, for each detected object, a respective set of regions in the matrix of sensing elements, each region of the set of regions being associated to a respective time;
- receiving events produced by the event-based sensor during a predefined time interval;
- determining groups of events, each group comprising at least one event among said received events;
- for each group of events, determining a respective zone in the matrix of sensing elements, the zone including all events of the group of events;
- determining associations between the determined zones and the determined regions; and
- updating a set of detected objects and/or a set of determined tracks based on the associations.

Such procedure corrects errors and improves tracking accuracy during the second process. The determination of the zones in the matrix of the sensing elements may, for instance, be performed based on a clustering algorithm.

In an embodiment, the first process may further comprise determining a segmentation mask for the detected object. The second process may also comprise updating the segmentation mask based on asynchronous events produced in a neighborhood of the segmentation mask.

By "segmentation" it is meant any process of partitioning an image into multiple sets of pixels, each pixel of the sets being assigned to a label, such that pixels with the same label share certain characteristics. For instance, a same label may be assigned to all pixels corresponding to a car, to a bike, to a pedestrian, etc.

By "segmentation mask" it is meant a set of pixels having the same label, and corresponding to a same object. Therefore, the edges of the segmentation mask may correspond to the edges of the object, and the inside of the mask are pixels belonging to the object.

Using segmentation masks allows more accurately determining the position of the object in the scene. This is possible because no predefined model for the shape of the object is required for running the first and the second processes.

Furthermore, the method may comprise:
- extracting first descriptive parameters associated to events received from the event-based sensor;
- extracting second descriptive parameters associated to events corresponding to the segmentation mask; and
- updating the segmentation mask by comparing a distance between one of the first descriptive parameters and one of the second descriptive parameters to a predefined value;
- wherein the first and the second descriptive parameters associated to an event comprise at least one of a polarity of the event and a speed of the event.

The segmentation mask may thus be accurately updated at each iteration of the first and/or the second process.

Another aspect of the present invention relates to a signal processing unit comprising:
- an interface for connecting to an event-based sensor having a matrix of sensing elements that produce events asynchronously from light received from a scene, wherein, from each sensing element of the matrix, respective events are produced as a function of variations of light incident on the sensing element; and a processor configured to:

detect, by a first process, an object in the scene from asynchronous events produced by the event-based sensor; and determine, by a second process, a track associated to the detected object from asynchronous events produced by the event-based sensor, wherein the first process has a time resolution lower than the second process.

Yet another object of the present invention relates to a computer program product comprising stored instructions to be executed in a processor associated with an event-based sensor having a matrix of sensing elements that produce events asynchronously from light received from a scene, wherein, from each sensing element of the matrix, respective events are produced as a function of variations of light incident on the sensing element, wherein execution of the instructions causes the processor to:

detect, by a first process, an object in the scene from asynchronous events produced by the event-based sensor; and determine, by a second process, a track associated to the detected object from asynchronous events produced by the event-based sensor, wherein the first process has a time resolution lower than the second process.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

In the context of the present invention it is assumed that an event-based asynchronous vision sensor is placed facing a scene and receiving the light flow of the scene through acquisition optics comprising one or more lenses. For instance, the sensor may be placed in the image plane of the acquisition optics. The sensor comprises a group of sensing elements organized into a matrix of pixels. Each pixel corresponding to a sensing element produces successive events depending on variations of light in the scene. The sequences of events e(p,t) received asynchronously from the photosensitive elements p are processed to detect and track objects in the scene.

Figure 1:
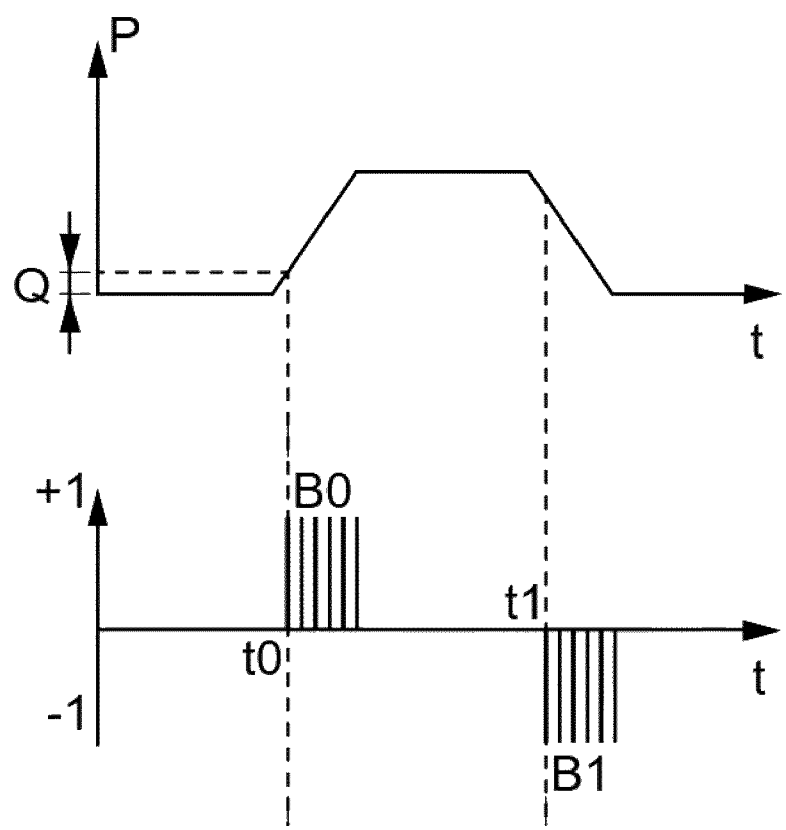
FIG. 1 represents an example of a light profile received by an asynchronous sensor and a signal generated by the asynchronous sensor in response to the light profile.
Figure 2:
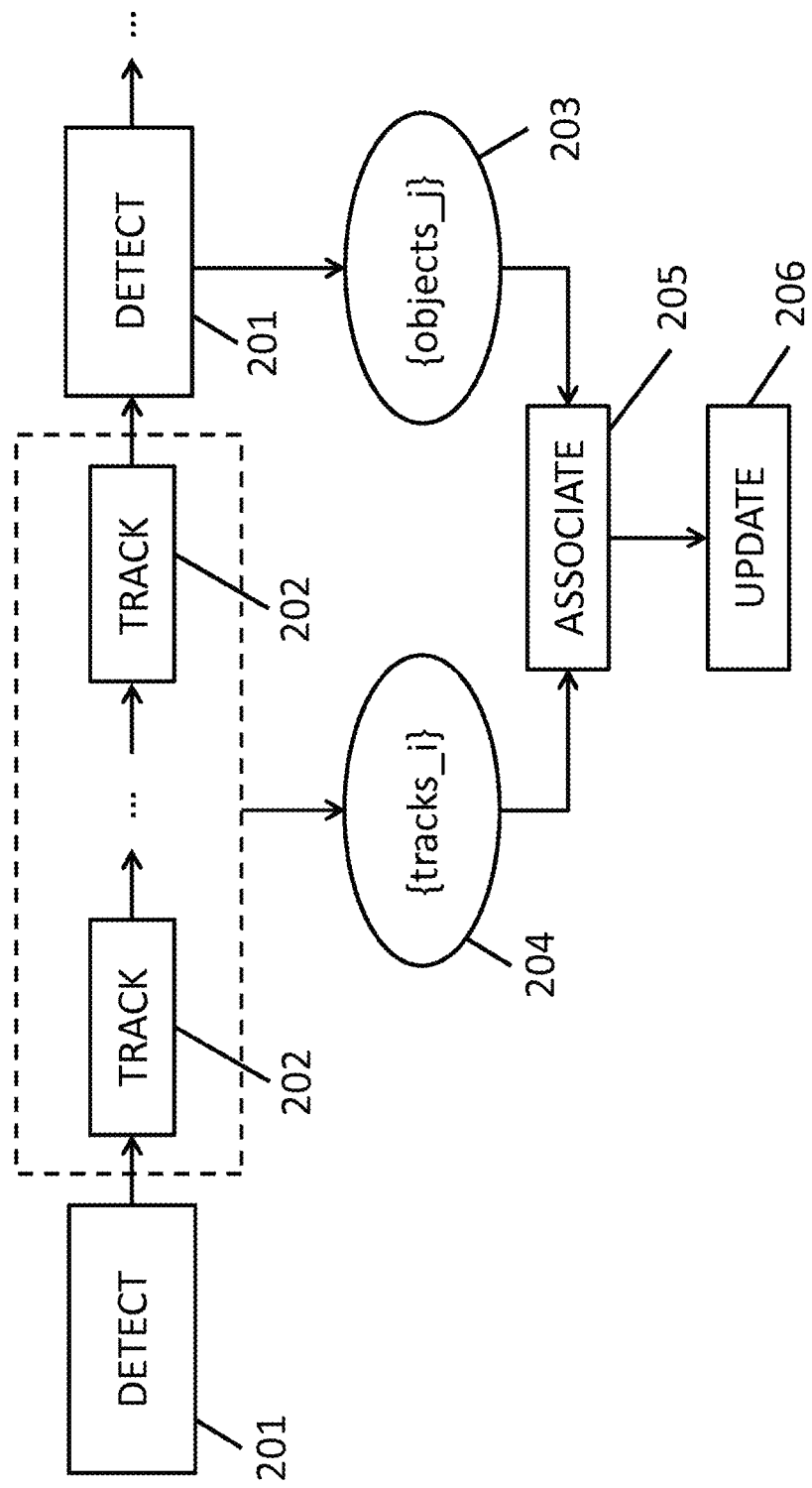
FIG. 2 is a flow chart describing a possible embodiment of the present invention.

FIG. 2 is a flow chart describing a possible embodiment of the present invention.

According to the present invention, the method of tracking objects may comprise a first iterative process 201 and a second iterative process 202. The first process 201 has a time resolution lower than the second process 202. Therefore, the first process 201 may also be called "slow process", and the second process 202 may also be called "fast process".

In an embodiment, during an iteration of first process 201 at a time $t_n$, a set of objects are detected in the scene based on information received for the whole field of view or a large portion of it (for instance, a portion representing a percentage of the field of view greater than 70%). Said information may be the asynchronous events produced by the event-based sensor during a time interval. For instance, the information may correspond to the asynchronous events produced by the event-based sensor between the previous iteration (at time $t_{n-1}$) of the slow process 201 and the current iteration (at time $t_n$) of the slow process 201, or between $t_n-\Delta t$, $\Delta t$ being a predetermined time interval.

During an iteration of the slow process 201, some objects of the scene are detected. For instance, it is possible to generate a frame from the received information (i.e. the received asynchronous events) and to run an object detection algorithm of the prior art on this frame. When the sensor is configured for providing a grayscale information associated to an asynchronous event, for instance with a sensor of the ATIS type, frames can be built from grayscale measurements, by attributing to each pixel of the image the grayscale of the last (i.e. the most recent) event received at this pixel.

When grayscale measurements are not available, for instance with sensor of the DVS type, frames can be obtained by summing the events received during the time interval. Alternatively, for each pixel of the image, the time of the last event (i.e. the most recent event) received at this pixel may be stored and the frame may be generated by using these stored times. Another alternative consists in reconstructing the grayscales from the events, as proposed for instance in "Real-time intensity-image reconstruction for event cameras using manifold regularization", Reinbacher et al., 2016.

Other detection algorithms may be used, without necessarily generating a frame. For instance, it is possible to count received events in a given region of the matrix of sensing elements and to apply an event-based (or "event-driven") classifier if the number of events is larger than a predefined threshold. An alternative is to run such classifier in all possible locations and scales of the field of view.

It has to be noted that the time between two successive iterations of the slow process 201 is not necessarily fixed. For instance, a new iteration of the slow process 201 may be run when the number of events produced during the time interval in the whole field of view or in one or more zones of the field of view exceeds a predefined threshold. In addition or alternatively, the iterations of the slow process 201 may be performed according to a predefined time sequence (with constant or variable time step).

The slow process 201 outputs a set of detected objects 203. This set of objects 203 may be used for updating tracks or initializing new tracks as explained below. Advantageously, the slow process is configured for determining, for each detected object, a relative category of object (e.g. "car", "pedestrian", "road sign", etc.). For instance, this may be performed by using an algorithm based on machine learning.

During the fast process 202, tracks associated to respective objects are updated based on the asynchronous events produced by the event-based sensor. In an embodiment, this update is performed based on the asynchronous events produced in a small zone of the matrix of sensing elements, e.g. in a region located around the object and comprising the object. Of course, it may be several regions of interest (e.g. each being associated to an object to be tracked). For instance, this region may be defined by considering a neighborhood of the edges of the object (such as a 4-, 8-, or 16-pixel connectivity neighborhood). Therefore, the fast process 202 is performed based on local information around the object detected during the slow process 201, or around the position of the object given by the track at a previous iteration of the fast process 202 (by contrast with the slow process 201, which is performed based on global information over the whole field of view or a large portion of it).

New tracks may also be initialized during the fast process 202. For instance, when a tracked object split in two or more objects, a new track may be respectively generated for each of the splits. New tracks may also be initialized if a fast detector is run during the fast process 202.

A new iteration of the fast process may be run at each new event produced in a region of the matrix of sensing elements, or when the number of events produced in a region of the matrix of sensing elements exceeds a predefined threshold. Therefore, the time between two successive iterations of the fast process 202 is generally variable. Since the information to be processed is local and contains only "relevant" data (no redundancy and relating to a change in the scene), the fast process 202 may be run at very high time resolution.

Furthermore, a new iteration of the slow process 201 may be run if the number of events produced in one or several region(s) of interest exceeds another predefined threshold. Indeed, a large number of events may indicate strong changes in the scene, and running a new iteration of the slow process may provide more reliable information on these changes.

The region of the matrix of sensing elements may be updated during an iteration of the fast process. Indeed, when the object to be tracked is moving in the scene, its shape may change with time (e.g., a car making a turn may be seen from behind at one time, and in profile at a later time). Since events are received on the edges of the object, the region of the matrix of sensing elements may be updated based on the received events (by suppressing/adding pixels corresponding to the edges). A new iteration of the slow process 201 may be run based on a parameter of the region of the matrix of sensing elements (e.g. the shape or the size). For instance, if the size of the region of the matrix of sensing elements significantly increases/decreases between two iterations of the fast process 202 (e.g. the difference of the sizes at two different times exceeds a fixed percentage), or if the shape of the region of the matrix of sensing elements significantly changes between two iterations of the fast process 202, it may indicate that the region of the matrix of sensing elements now comprises two different objects or another object than the one to which the track was associated. Running a new iteration of the first process allows an accurately determination of the correct scenario.

The fast process 202 outputs a set of tracks 204. This set of tracks 204 may be obtained by any event-based tracking algorithm of the prior art. As mentioned above, purely event-based tracking algorithms may be very sensitive to outliers and may suffer from drift. In an embodiment, associations 205 may be determined between the tracks determined by the fast process 202 and the objects detected by the slow process 201, in order to avoid these drawbacks and to improve the robustness and stability of the tracking. Based on these associations, the set of tracks 204 and/or the set of detected objects 203 may be updated 206.

Figure 3B:
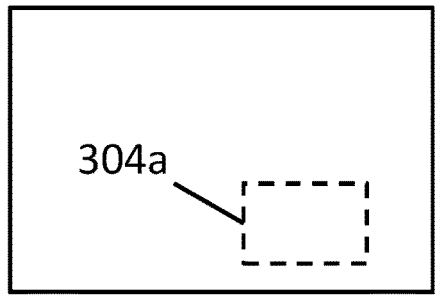
FIGS. 3a and 3b represent an example of detection and tracking of an object, in a possible embodiment of the invention.
Figure 3B:
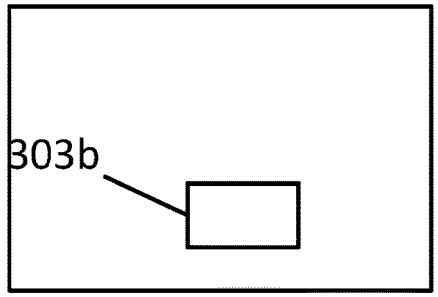
Figure 3B:
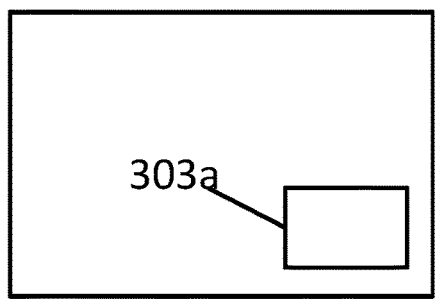
Figure 3B:
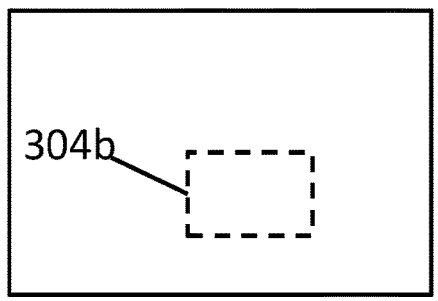
Figure 3A:
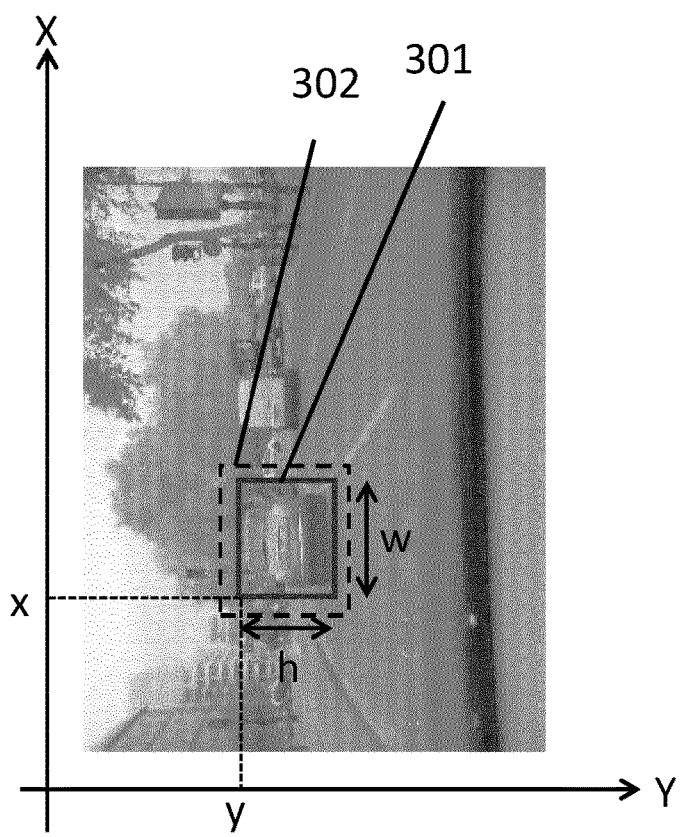

FIGS. 3*a* and 3*b* represent an example of detection and tracking of an object, in a possible embodiment of the invention.

FIG. 3*a* represents an object (e.g. a car) detected during an iteration of the slow process 201. In the embodiment of FIG. 3*a*, the object is represented by a rectangular bounding box 301 that comprises the object. In this case, a bounding box may be represented by a tuple (x,y,w,h), where (x,y) are coordinates of the top left corner of the rectangle, w is the width and h is the height of the rectangle. A "position" of the bounding box may correspond to the position (x,y) of the top left corner (or any other point of the box, for instance another corner, the center of gravity, etc.). Of course, other representations are possible (e.g. the shape of the object, or another predefined geometrical object than a rectangle). More generally, such representation may be referred to as "region of interest". A region 302 comprising the region of interest may be determined for running the fast process 202: the tracking may then be performed based on events occurred in this region 302.

FIG. 3*b* represents a sequence of detection and tracking of an object obtained at times t1, t2, t3, t4, with t1<t2<t3<t4, in a possible embodiment. The full line boxes 303*a*, 303*b* correspond to regions of interest outputted by the slow process at respective times t1 and t4, and the dotted boxes 304*a*, 304*b* correspond to regions of interest outputted by the fast process at respective times t2 and t3. As represented in this figure, the region of interest may be updated during the fast process.

Figure 4:
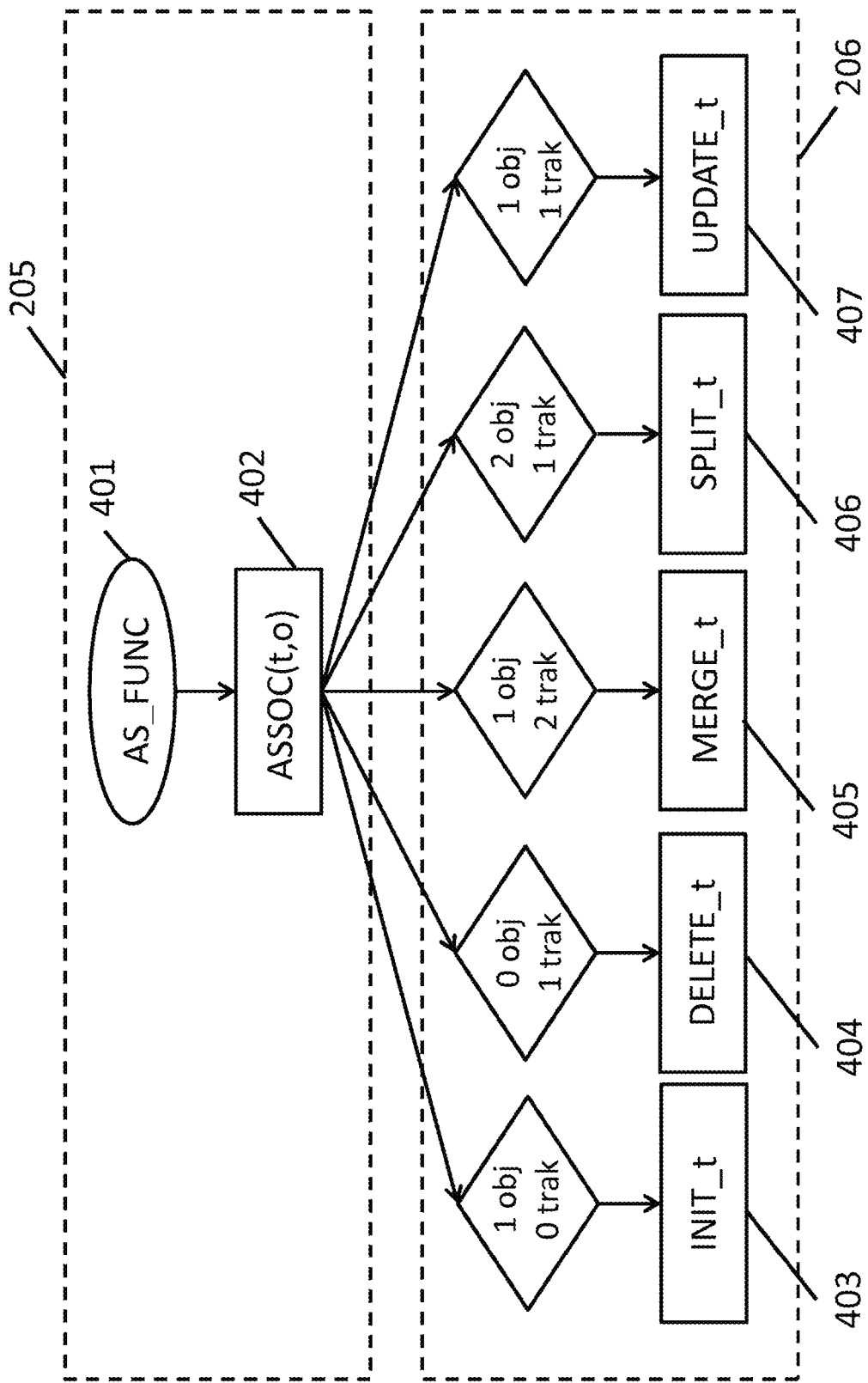
FIG. 4 is a flow chart describing an update of the set of tracks and of the set of objects, in a possible embodiment of the invention.

FIG. 4 is a flow chart describing an update of the set of tracks and of the set of objects, in a possible embodiment of the invention.

As represented in FIG. 4, the determination 205 of associations may be based on a predefined association function 401 of an object o and a track t: f(t,o). For each track t, a corresponding object o may be determined 402 by optimizing this association function 401.

Figure 5:
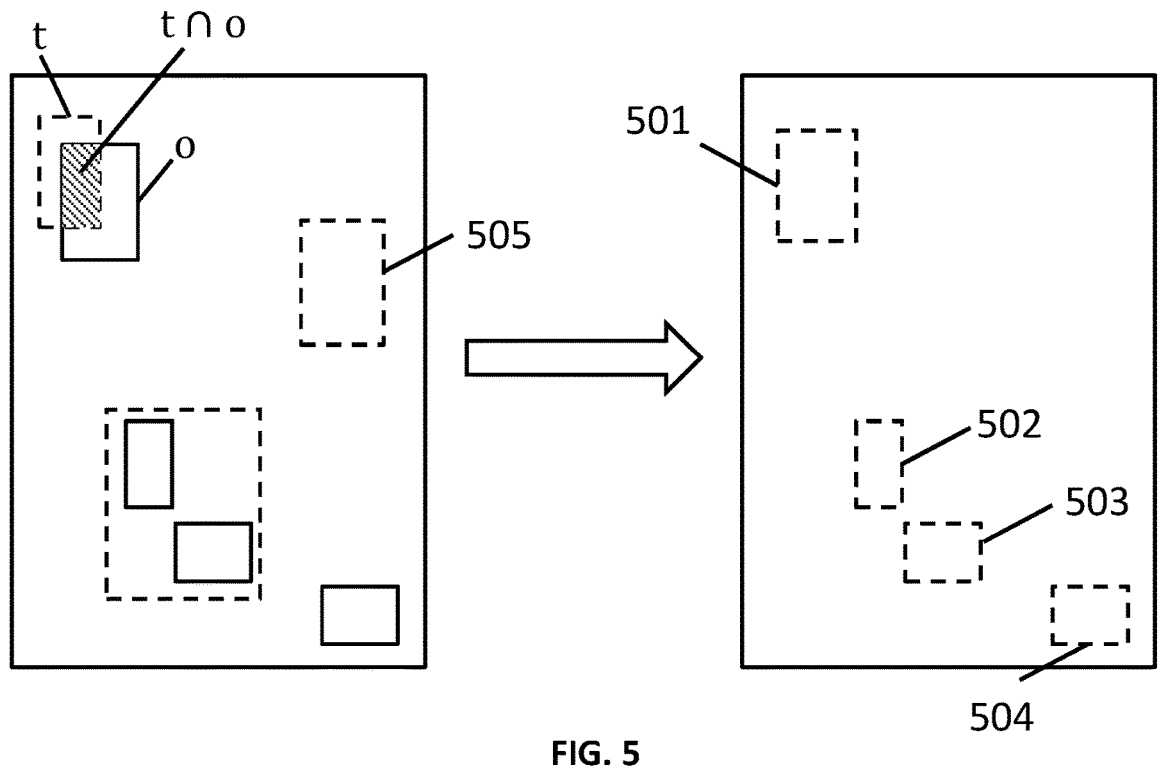
FIG. 5 represents an update of the set of tracks and of the set of objects, in a possible embodiment of the invention.

In the case where objects are represented by respective regions of interest, the association function 401 may be defined based on the areas of the regions of interest. For example, such function 401 may be defined as:

$$f(t, o) = \frac{\text{area}(t \cap o)}{\text{area}(t) + \text{area}(o)}$$

where area(r) is the area of the figure r (in the case of a rectangle, area(r)=width×length) and t∪o is the intersection of t and o, as represented in the left part of FIG. 5 (where a full line box corresponds to an object detected by the slow process and a dotted box corresponds to the most recent position of a track outputted by the fast process, all boxes being represented in a same frame). In this case, association may be performed between a track t and an object o by maximizing the function 401 f(t,o).

Referring again to FIG. 4, the set of tracks and/or the set of detected objects may then be updated as follows. For each object o among the set of detected objects, determine the track(s) t in the set of determined tracks with the highest value of f(t,o):

If such value is not zero, associate the object o to the determined track t, and update 407 the size and/or position of t based on the size and/or position of o and/or t (for instance, the position of t may be equal to the position of o, or to a combination of the position of t and o—for instance a center or a centroid);

If there are two tracks $t_1$ and $t_2$ such that, for a given object o, $$t_1 = \operatorname*{argmax}_t f(o, t)$$

and $f(o, t_1)-f(o, t_2)<\varepsilon$, where $\varepsilon$ is a predefined parameter (chosen preferably small enough), then merge 405 $t_1$ and $t_2$. The size and/or the position of the merged track may be determined based on the size and/or the position of o;

If there are two objects $o_1$ and $o_2$ among the detected objects such that $$t_m = \operatorname*{argmax}_t f(o_1, t) = \operatorname*{argmax}_t f(o_2, t)$$

then split 406 $t_m$ into two tracks $t_1$ and $t_2$ having a position and/or a size respectively set to the ones of $o_1$ and $o_2$;

If a track t is not associated to any object o, delete 404 said track t; and If an object o is not associated to any track t, create 403 a new track with size and/or position equal to those of o.

An example of such update of the set of tracks is depicted in the right part of FIG. 5. The box 501 corresponds to the case where an object was associated to a single track (the size/position of the box being a combination of the size/position of o and t). The boxes 502 and 503 correspond to the case where a track is split into two tracks because it was associated to one object. The box 504 corresponds to the case where a new track is created because a new object has been detected. The track 505 is deleted because it is not associated to any object.

Of course, other association functions may be used. For instance, f(t,o) may correspond to a mathematical distance (e.g. Euclidean distance, Manhattan distance, etc.) between two predefined corners of t and o (e.g. between the top left corner of t and the top left corner of o). In this case, association may be performed between a track t and an object o by minimizing the function f(t,o).

More complex distance metrics may be used for performing associations between objects and tracks, e.g. by computing a descriptor (as defined for instance in "HATS: Histograms of Averaged Time Surfaces for Robust Event-based Object Classification", Sironi et al., CVPR 2018) from the events falling in the bounding box during a given period of time and comparing the norm of the difference of the descriptors.

In an embodiment, the fast process may comprise an update of the tracks (independently from the detection results of the slow process). For instance, it is possible, during the fast process, to accumulate events for a predefined period of time T (for instance 5 to 10 ms). Several iterations of the event-based tracking process may be performed during T. Let AE denote the set of accumulated events during T. Advantageously, AE comprises all events received during T in the whole field of view or in a large portion of it. Alternatively, AE may comprise all events received during T in one or more small portion(s) of the field of view.

The events of AE may then be clustered into at least one group, by using a clustering algorithm (e.g. the Medoidshifts clustering algorithm, but other algorithms may be used). This clustering is typically done by grouping events together if they are "close" (according to a mathematical distance) to each other in time and space, while being distant from events in other groups. A cluster may be represented by the smallest rectangle that includes all the events of the cluster (other representations are possible). For the sake of simplification, in the following, a "cluster" refers to both the group of event and its representation (e.g. a rectangle).

For each track t among the set of tracks and each cluster c among the set of clusters, f(t,c) may be calculated, f being an association function as defined above. For a given track t, the cluster c corresponding to the highest (or the smallest, depending on the chosen association function) f(t,c) may be associated to t, and the position and size of t may be updated according to the position and size of c. In an embodiment, a cluster c not associated to any track t may be deleted (this allows suppressing outliers). In an embodiment, it may be decided to suppress the cluster c only if the number of events in c is below a predetermined threshold.

In embodiments, segmentation may be performed for labeling all the pixels of the region of interest and distinguishing the pixels belonging to the tracked object from the other pixels. For instance, all the pixels of the object may be associated to label 1, and all other pixels may be associated to label 0. Such segmentation gives a precision on the position of the object within the region of interest. The set of labeled pixels corresponding to the object (e.g. all the pixels associated to the label 1) is called "segmentation mask". The segmentation may be performed by using an additional segmentation algorithm after detecting the object during the slow step, or in the same time, by using a detection and segmentation algorithm on the frames generated from the event-based sensor. The track associated to an object may then comprise a time sequence of segmentation masks, wherein each mask may be correspond to a position (e.g. the center of gravity of the mask).

Figure 6:
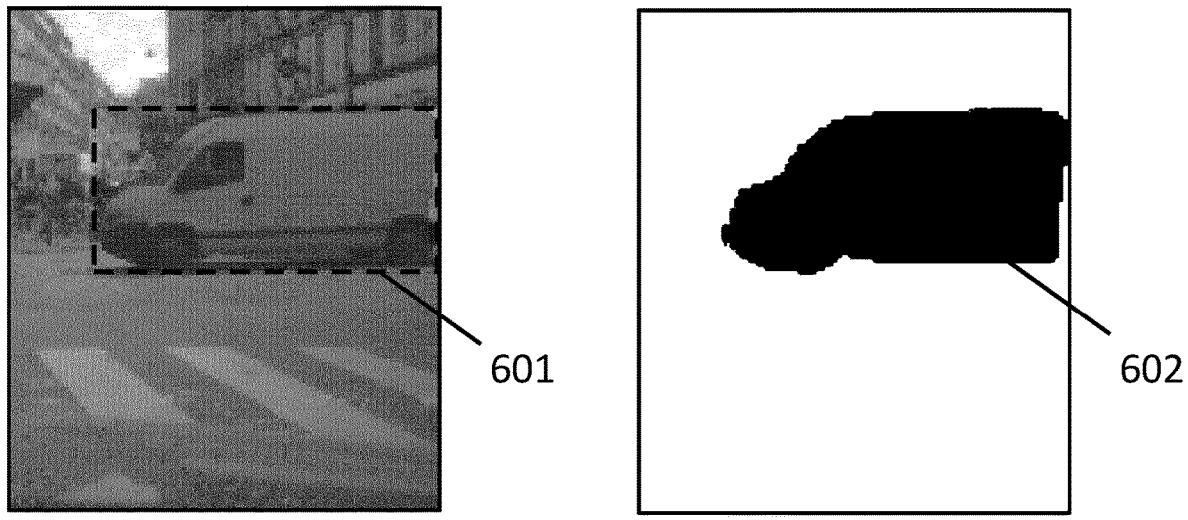
FIG. 6 represents a segmentation mask associated to an object of the scene, in a possible embodiment of the invention.

The segmentation mask can be generated from the detected region of interest (e.g. the detected bounding box). For instance, the segmentation mask may be determined by running Convolutional Neural Network (CNN) algorithm on frames generated by the sensor. Alternatively, the set of events received in the last time interval can be used to determine the mask boundaries. For instance, this can be done by computing the convex hull of the set of pixels that received an event in the last time interval. FIG. 6 represents an example of a region of interest 601 and a segmentation mask 602 obtained in a possible embodiment of the invention.

The segmentation mask may be updated during the fast loop. In an embodiment, this update is performed event by event. For instance, if an event is close (e.g. in a predefined neighborhood of a pixel of the mask), it may be assumed that this event is generated by the moving object. Therefore, if this event is located outside the mask, the corresponding pixel may be added to the mask, and if the event is located inside the mask, the corresponding pixel may be removed from the mask.

In addition or alternatively, the segmentation mask may be updated based a mathematical distance between one or more descriptor(s) associated to an event and one or more descriptor(s) associated to the mask. More specifically, an event can be described by a descriptor which is a vector containing information relative to polarity and/or speed (the speed may be computed for example by using event-based optical flow algorithms). Similar descriptors can be associated to the mask, by averaging the descriptors of all the events that are assigned to the mask. Then, an event may be added to the mask if a mathematical distance between its descriptor and the mask descriptor is below a predefined threshold, and an event may be removed from the mask if this distance is above this threshold.

In another embodiment, updating the mask (during the fast process) is performed by using groups of events and probabilistic inference. The idea is to use the prior knowledge of the scene (the result of the detection/segmentation algorithm of the slow process) together with the new information (a group of incoming events) to compute the likelihood of changes in the scene. The segmentation mask may then be updated based on the scenario(s) associated with maximal likelihood(s).

For instance, the prior knowledge of the scene may be represented by a matrix of probability (knowledge matrix), which is a grid of values representing the probability of a pixel belonging to an object, e.g. a car (for instance, we know that there are cars in the mask (100% car probability) and none outside (0% car probability)). This matrix may be obtained from the masks of the active tracks, by using a technique of the prior art, for instance Conditional Random Fields (CRF), or optical flow.

The received events may then be used to update the image, for instance based on their greyscale values (in case of an ATIS-type sensor). The received events are also used to update the knowledge of the scene. For instance, events on the background may increase the probability of a car being there (the event might mean the car just moved into the corresponding pixel) and events on the car masks may decrease the probability of a car still being there (the event might mean the car went away from the pixel).

After those updates there may be for instance regions with very low probability, e.g. below 5% (regions outside the masks for which no events are received), regions with intermediate probability, e.g. between 5% and 95% (regions in which events are received) and regions with very high probability, e.g. above 95% (regions inside the mask with for which no events are received).

Once all updates are performed, the knowledge matrix and the grey image may be used to construct a probabilistic model by statistical inference (finding numerically the most likely configuration). The mask may then be updated based on this probabilistic model.

Optionally, regularization operations may be applied on the updated mask (e.g. to avoid holes in the segmentation). If the mask is split in two, a new track may be created; if the mask is collapsed or too low in term of probability a new detection iteration may be performed (if no object is detected the track may be deleted). Otherwise the mask may simply be added to the track.

Figure 7:
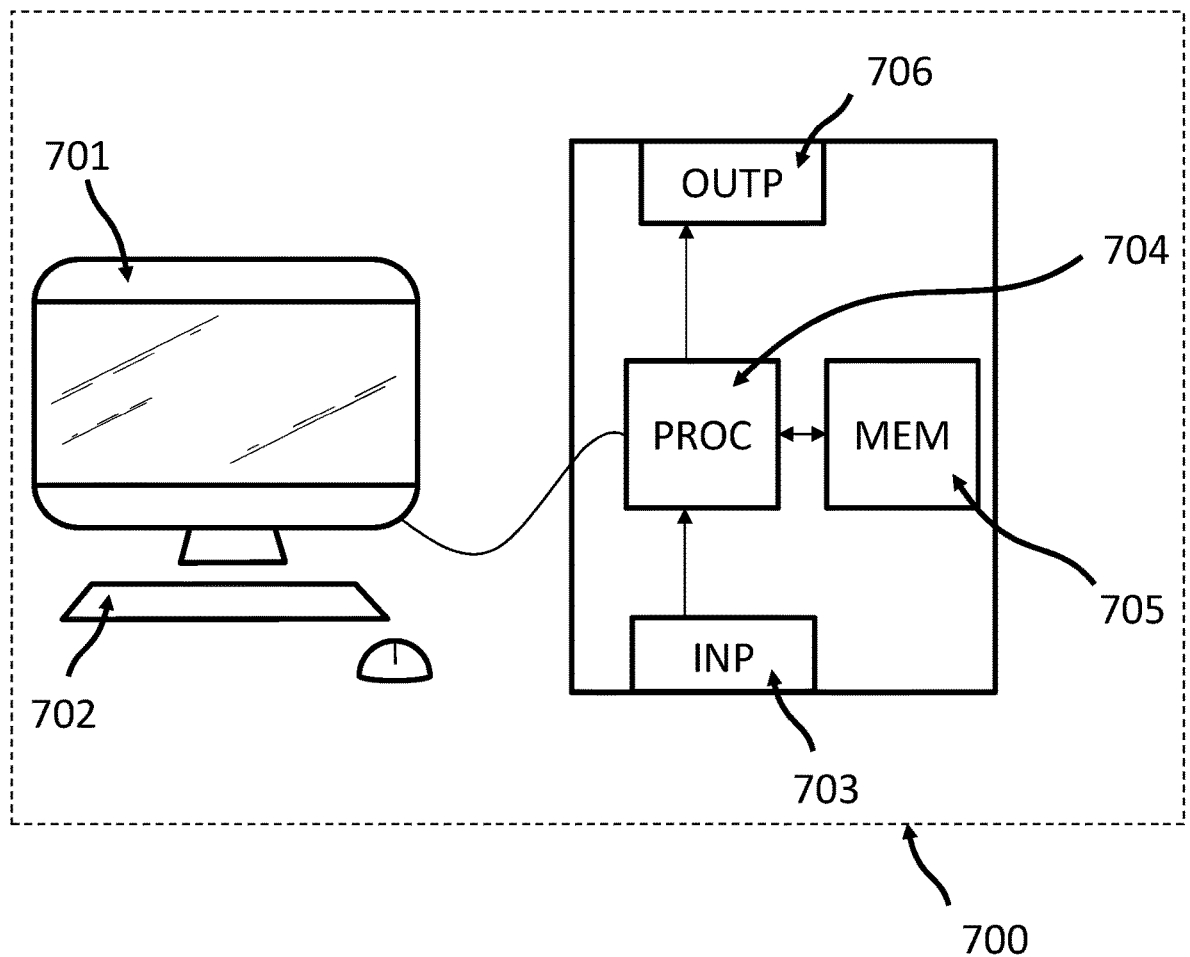
FIG. 7 is a possible embodiment for a device that enables the present invention.

FIG. 7 is a possible embodiment for a device that enables the present invention.

In this embodiment, the device 700 comprise a computer, this computer comprising a memory 705 to store program instructions loadable into a circuit and adapted to cause circuit 704 to carry out the steps of the present invention when the program instructions are run by the circuit 704.

The memory 705 may also store data and useful information for carrying the steps of the present invention as described above.

The circuit 704 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This computer comprises an input interface 703 for the reception of asynchronous events according to the invention and an output interface 706 for providing the results of the tracking method (e.g. a series of position of an object in time and the class of the object).

To ease the interaction with the computer, a screen 701 and a keyboard 702 may be provided and connected to the computer circuit 704.

FIG. 2 is a flow chart describing a possible embodiment of the present invention. Part of this flow chart can represent steps of an example of a computer program which may be executed by the device 700.

Expressions such as "comprise", "include", "incorporate", "contain", "is" and "have" are to be construed in a non-exclusive manner when interpreting the description and its associated claims, namely construed to allow for other items or components which are not explicitly defined also to be present.

A person skilled in the art will readily appreciate that various parameters disclosed in the description may be modified and that various embodiments disclosed may be combined without departing from the scope of the invention.

The invention claimed is:

1. A method of tracking objects in a scene observed by an event-based sensor having a matrix of sensing elements that produce events asynchronously,
   wherein, from each sensing element of the matrix, respective events are produced as a function of variations of light incident on the sensing element,
   the method comprising:
   detecting, by a first process, an object in the scene from asynchronous events produced by the event-based sensor; and
   determining, by a second process, a track associated to the detected object from asynchronous events produced by the event-based sensor,
   wherein the first process has a time resolution lower than the second process.

2. The method of claim 1, wherein the first process comprises determining a category of the detected object.

3. The method of claim 1, wherein a new iteration of the first process is run according to a predefined time sequence.

4. The method of claim 1, wherein the first process comprises determining a region of interest in the matrix of sensing elements, the region of interest including the detected object; and
   wherein the second process comprises determining the track based on asynchronous events produced by sensing elements in a region including the region of interest.

5. The method of claim 4, wherein the second process comprises updating the region of interest based on asynchronous events produced in a region including the region of interest.

6. The method of claim 4, wherein the second process further comprises running a new iteration of the first process based on a parameter of the region of interest, wherein the parameter is one of a size of the region of interest and a shape of the region of interest.

7. The method of claim 4, wherein the second process further comprises running a new iteration of the first process if a number of events produced in the region of interest during a time interval exceeds a threshold.

8. The method of claim 1, further comprising:
determining associations between detected objects and determined tracks; and
updating a set of detected objects and/or a set of determined tracks based on the associations.

9. The method of claim 8, further comprising:
if a given object among detected objects is associated with a given track among determined tracks, updating the given track based on a position of the given object.

10. The method of claim 8, further comprising:
if a given object among detected objects is not associated with any track among determined tracks, initializing a new track corresponding to the given object;
if a given track among determined tracks is not associated with any object among detected objects, deleting the given track;
if a first object and a second object among detected objects are both associated with a first track among determined tracks, initializing a second track from the first track, each of the first and second tracks corresponding to a respective object among the first and second objects; and
if a given object among detected objects is associated to a first track and a second track among determined tracks, merging the first track and the second track.

11. The method of claim 1, wherein the second process further comprises:
determining, for each detected object, a respective set of regions in the matrix of sensing elements, each region of the set of regions being associated to a respective time;
receiving events produced by the event-based sensor during a predefined time interval;
determining groups of events, each group comprising at least one event among said received events;
for each group of events, determining a respective zone in the matrix of sensing elements, the zone including all events of the group of events;
determining associations between the determined zones and the determined regions; and
updating a set of detected objects and/or a set of determined tracks based on the associations.

12. The method of claim 1, wherein the first process further comprises determining a segmentation mask for the detected object, and wherein the second process comprises updating the segmentation mask based on asynchronous events produced in a neighborhood of the segmentation mask.

13. The method of claim 11, further comprising:
extracting first descriptive parameters associated to events received from the event-based sensor;
extracting second descriptive parameters associated to events corresponding to the segmentation mask; and
updating the segmentation mask by comparing a distance between one of the first descriptive parameters and one of the second descriptive parameters to a predefined value,
wherein the first and the second descriptive parameters associated to an event comprise at least one of a polarity of the event and a speed of the event.

14. A signal processing unit, comprising:
an interface for connecting to an event-based sensor having a matrix of sensing elements that produce events asynchronously from light received from a scene, wherein, from each sensing element of the matrix, respective events are produced as a function of variations of light incident on the sensing element; and
a processor configured to:
detect, by a first process, an object in the scene from asynchronous events produced by the event-based sensor; and
determine, by a second process, a track associated to the detected object from asynchronous events produced by the event-based sensor;
wherein the first process has a time resolution lower than the second process.

15. A computer-readable medium having computer code stored thereon for execution in a processor associated with an event-based sensor having a matrix of sensing elements that produce events asynchronously from light received from a scene, wherein, from each sensing element of the matrix, respective events are produced as a function of variations of light incident on the sensing element, wherein execution of the instructions causes the processor to:
detect, by a first process, an object in the scene from asynchronous events produced by the event-based sensor; and
determine, by a second process, a track associated to the detected object from asynchronous events produced by the event-based sensor,
wherein the first process has a time resolution lower than the second process.

* * * * *